Patented May 4, 1926.

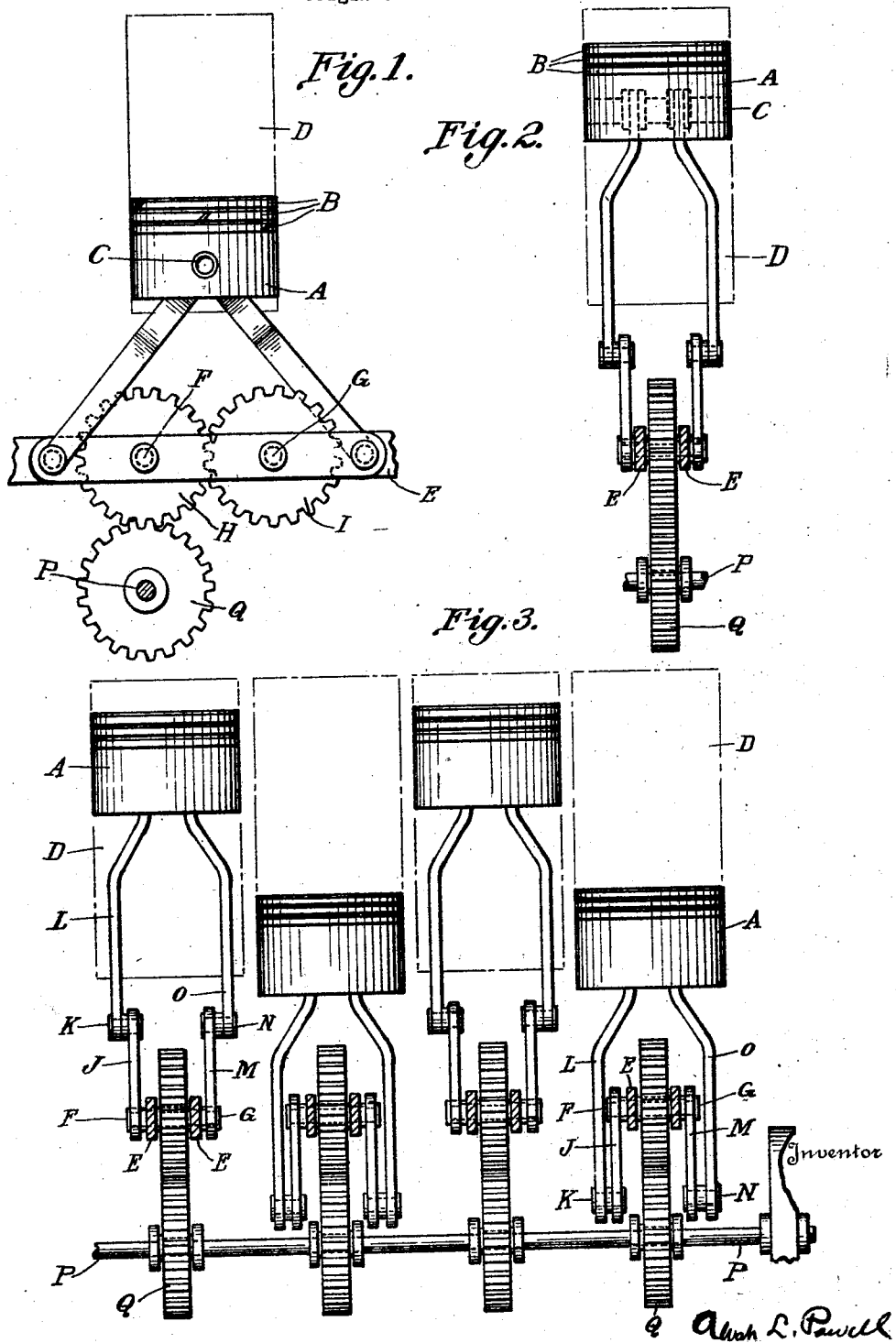

1,583,368

UNITED STATES PATENT OFFICE.

ALVAH L. POWELL, OF MILES CITY, MONTANA, ASSIGNOR TO THE A. L. POWELL POWER COMPANY INCORPORATED, OF MILES CITY, MONTANA, A CORPORATION.

TRANSMISSION FOR ENGINES.

Original application filed May 3, 1921, Serial No. 466,591. Divided and this application filed December 22, 1922. Serial No. 608,506.

*To all whom it may concern:*

Be it known that I, ALVAH L. POWELL, a citizen of the United States, residing at Miles City, in the county of Custer and State of Montana, have invented certain new and useful Improvements in Transmissions for Engines, of which the following is a specification.

My invention relates to improvements in transmission for engines whereby the side slap of the piston against the cylinder is eliminated. This application is a division of application bearing Serial Number 466,591 filed May 3, 1921.

In engines of the conventional type, the piston presses on one side of the cylinder during the explosion stroke while there is very little lateral pressure on the other side of the cylinder. This causes both the cylinder and the piston, together with the piston rings, to be unevenly worn which necessitates the reboring of the cylinder. It is well known that the side slap of the piston causes much friction and consequent loss of power. These objections I am enabled to overcome by my improved construction.

In the annexed drawings I show an application of my invention in which:

Figure 1 is an elevation of one form of my invention.

Figure 2 is a side elevation thereof and

Figure 3 is a side elevation showing a plurality of the transmission units assembled so as to transmit the power developed in all of the cylinders to a single shaft.

In the drawings A designates a piston provided with any conventional type of piston rings B and a wrist pin C extending diametrically through the piston. The piston A is, of course, slidable in the cylinder D as is well known in the art. In a suitable frame E are journaled stub shafts F and G on which are securely attached gears H and I, respectively, which gears intermesh with each other, are of the same size and are provided with the same number of teeth, whereby these gears may rotate in opposite directions but at the same rate of speed. The shaft F extends beyond the frame E in one direction and is provided with a crank arm J on the outer end thereof which crank arm carries a pin K. A pitman L connects the wrist pin C to the pin K. In like manner the shaft G extends slightly beyond the other side of the frame E which shaft carries a crank M which is connected to the piston by the pin N, pitman O and wrist pin C.

A main shaft P is journaled beneath the gear H and carries a gear Q adapted to mesh with the gear H and to be driven thereby. Obviously, however, the gear Q could be made to mesh with the gear I inasmuch as it is immaterial which of the gears H or I drive the gear Q.

In my preferred construction I have made the gear Q of the same size as the gears H and I but I do not confine myself to such a construction for it may be advisible under certain conditions to form the gear Q larger or smaller than the gears H and I.

The composition of forces in my engine exactly balance so that side slap is prevented and so that there would be no tendency of the piston A to press against the side of the cylinder B in one direction any more than in any other direction.

I furthermore find it preferable to form the pitmans L and O of flat bar metal bent inwardly near the top ends thereof as is clearly shown is Figure 2 and 3 so as to place the bearings of the pitmans close together on the wrist pin C.

In operation, the force is transmitted from the piston A through the wrist pin C to the pitmans L and O and thence to the shafts F and G through the pins K and N and cranks J and M respectively. The force is then transmitted to the shaft P through the oppositely rotating intermeshing gears H and I and the gear Q which latter gear receives the combined force of the gears H and I.

While I have shown one preferred construction of my invention I do not limit myself to the specific construction shown therein except as I may limit myself in the following claim.

Having now described my invention, I claim:—

In a transmission for engines, a cylinder, a piston slidable therein, a wrist pin journaled in the said piston, two parallel shafts, bearings for said shafts, a crank on each shaft, pitmans connecting the crank and the wrist pin, intermeshing gears carried by the shafts and adapted to be rotated in opposite directions thereby, a third shaft, a gear thereon adapted to mesh with one of the aforementioned gears, the two cranks being positioned on opposite sides of the said intermeshing gears and being longer than the radii of the said gears whereby a long piston stroke is obtained.

In testimony whereof I affix my signature.

ALVAH L. POWELL.